US012561766B2

(12) United States Patent　　(10) Patent No.:　US 12,561,766 B2
　　Hendargo　　　　　　　　　　　　(45) Date of Patent:　Feb. 24, 2026

(54) CONTROL SYSTEM FOR OCT IMAGING, OCT IMAGING SYSTEM AND METHOD FOR OCT IMAGING

(71) Applicant: Leica Microsystems NC, Inc., Durham, NC (US)

(72) Inventor: Hansford Hendargo, Durham, NC (US)

(73) Assignee: LEICA MICROSYSTEMS NC, INC., Durham, NC (US)

( * ) Notice: Subject to any disclaimer, the term of this patent is extended or adjusted under 35 U.S.C. 154(b) by 286 days.

(21) Appl. No.: 18/253,607

(22) PCT Filed: Nov. 18, 2021

(86) PCT No.: PCT/EP2021/082095
§ 371 (c)(1),
(2) Date: May 19, 2023

(87) PCT Pub. No.: WO2022/106516
PCT Pub. Date: May 27, 2022

(65) Prior Publication Data
US 2024/0054616 A1　　Feb. 15, 2024

Related U.S. Application Data

(60) Provisional application No. 63/115,634, filed on Nov. 19, 2020.

(51) Int. Cl.
*G06T 5/70* (2024.01)
*G06T 5/10* (2006.01)
*G06T 11/00* (2006.01)

(52) U.S. Cl.
CPC .................. *G06T 5/70* (2024.01); *G06T 5/10* (2013.01); *G06T 11/008* (2013.01);
(Continued)

(58) Field of Classification Search
None
See application file for complete search history.

(56) References Cited

U.S. PATENT DOCUMENTS 9,095,281 B2　　8/2015　Sharma et al.
10,856,735 B2　12/2020　Chen et al.
(Continued)

FOREIGN PATENT DOCUMENTS

CN　　104166114 A　　11/2014
CN　　105342558 A　　2/2016
(Continued)

OTHER PUBLICATIONS

Bernd Hofer, Boris PovaÅ¾ay, Boris Hermann, Angelika Unterhuber, Gerald Matz, and Wolfgang Drexler, "Dispersion encoded full range frequency domain optical coherence tomography," Opt. Express 17, 7-24 (2009) (Year: 2009).*
(Continued)

*Primary Examiner* — S J Park
*Assistant Examiner* — Caroline E. Depalma
(74) *Attorney, Agent, or Firm* — LEYDIG, VOIT & MAYER, LTD.

(57)　　　　　　ABSTRACT

The invention relates to a control system for controlling optical coherence tomography imaging means for imaging a subject, the control system being configured to perform the following steps of an imaging process: receiving (212) a scan data set from the subject being acquired by means of optical coherence tomography, the scan data set including one or several spectra (270), performing (214) data processing on the spectrum or on each of the several spectra of the scan data set (122), including per spectrum: determining (216) a scaling factor (274) for the spectrum (270, 370, 372, 374), scaling (218) a baseline spectrum (272) with a scaling factor (274), and removing (220) the scaled baseline spec-
(Continued)

trum (276) from the spectrum (270); and providing (224) a baseline corrected image data set of the subject for an image of the subject to be displayed, to an optical coherence tomography imaging system and to a corresponding method.

15 Claims, 3 Drawing Sheets

(52) U.S. Cl.
CPC ............... *G06T 2207/10101* (2013.01); *G06T 2207/20056* (2013.01); *G06T 2207/30041* (2013.01)

(56) References Cited

U.S. PATENT DOCUMENTS

| | | | | |
|---|---|---|---|---|
| 2007/0188765 | A1* | 8/2007 | Zhao | G01B 9/02068 |
| | | | | 356/497 |
| 2013/0208240 | A1* | 8/2013 | Sharma | G06T 7/11 |
| | | | | 356/479 |
| 2014/0099012 | A1 | 4/2014 | Begin et al. | |
| 2016/0206195 | A1 | 7/2016 | Huang et al. | |
| 2017/0280989 | A1 | 10/2017 | Heeren | |
| 2018/0153395 | A1* | 6/2018 | Goto | G01B 9/02091 |

(56) References Cited

FOREIGN PATENT DOCUMENTS

| | | |
|---|---|---|
| CN | 109963494 A | 7/2019 |
| JP | 2018043085 A | 3/2018 |
| JP | 2019511273 A | 4/2019 |

OTHER PUBLICATIONS

Hofer B. et al.L Dispersion encoded full range frequency domain optical coherence tomography, Optics Express, OSA Publishing, US, vol. 17, Jan. 5, 2009, pp. 7-24, XP002554360.

\* cited by examiner

CONTROL SYSTEM FOR OCT IMAGING, OCT IMAGING SYSTEM AND METHOD FOR OCT IMAGING

TECHNICAL FIELD

The present invention essentially relates to a control system for optical coherence tomography (OCT) imaging means for imaging a subject, to an OCT imaging system including such control system, and to a method for imaging a subject, using OCT.

BACKGROUND

Optical coherence tomography (in the following also called OCT, its typical abbreviation) is an imaging technique that uses low-coherence light to capture two- and three-dimensional images from within optical scattering media (e.g., biological tissue) with high resolution. It is, inter alia, used for medical imaging. Optical coherence tomography is based on low-coherence interferometry, typically employing near-infrared light. The use of relatively long wavelength light allows it to penetrate into the scattering medium. A medical field of particular interest for OCT is ophthalmology, a branch of medicine related to (in particular human) eyes and its disorders and related surgeries.

SUMMARY

According to the invention, a control system, an OCT imaging system and a method for imaging a subject with the features of the independent claims are proposed. Advantageous further developments form the subject matter of the dependent claims and of the subsequent description.

The present invention relates to a control system for optical coherence tomography (OCT) imaging means for imaging a subject, in particular, for real-time imaging of the subject. This subject, preferably, includes or is an eye. The type of OCT to be used is, preferably, spectral domain OCT (also known as Fourier domain OCT), as will also be described later. The control system is configured to control optical coherence tomography imaging means to scan the subject by means of optical coherence tomography for acquiring scan data or a scan data set.

In OCT, areas of the sample (subject) or tissue that reflect back a lot of light will create greater interference than areas that do not. Any light that is outside the short coherence length will not interfere. This reflectivity profile is called an A-scan and contains information about the spatial dimensions and location of structures within the sample or tissue. A cross-sectional tomograph, called B-scan, may be achieved by laterally combining a series of these axial depth scans (A-scan). A B-scan can then be used to create a two-dimensional OCT image to be viewed.

In particular, Fourier domain optical coherence tomography (FD-OCT) uses the principles of low-coherence interferometry to generate two- or three-dimensional images of a subject (sample). Light from a light source is split between a reference arm and a sample arm. A signal pattern at a detector is generated that is composed of the base light spectrum and modulated by interference from light between the reference arm and sample arm.

The control system (or processing means provided therein) receives a scan data set from the subject being acquired by means of optical coherence tomography. The scan data set can include the intensity data for one or several depth-resolved reflectivity profiles of the sample, so-called A-scans. These raw data have to be processed in order to create an image to be viewed by, e.g., an operator of the OCT system on display means.

Such OCT data processing typically requires resampling and taking the Fourier transforms of this real-valued spectral interferograms (the spectra included in the scan data set) to generate the depth-resolved reflectivity profiles of the sample, the A-scans. Taking the Fourier transform, however, results in a high-signal and low-frequency artefact due to the strong base component of the light source, commonly known as the DC artefact. Furthermore, the presence of constant frequency noise can also lead to similar strong signal artefacts throughout an image.

In order to remove such DC artefact, data processing on the scan data (or on the spectra included therein) can comprise removing a baseline spectrum from each of the spectra of the scan data set. Then, a Fourier transform can be applied to each of the baseline corrected spectra and a baseline corrected image data set of the subject for an image of the subject to be displayed can be provided by the control system. An image corresponding to the image data set can then be display on display means. Note that the baseline correction is typically performed on a single spectrum corresponding to an A-Scan, while the image to be displayed typically is a two-dimensional image, a B-scan. Thus, several baseline corrected spectra have to be combined in order to determine all relevant data for a B-scan image.

A possible technique to remove the DC artefact is prior acquisition of the baseline spectrum and subtraction of the baseline from each subsequently acquired interferogram (spectrum). Alternatively, if a series of interferograms (spectra) are acquired and there is sufficient heterogeneity across the scan over either time or space, the interferograms can be averaged together to get an estimate for the baseline spectrum. This estimate can then be subtracted from every A-scan in the acquisition before taking the Fourier transform to remove the DC artefact.

However, both of these techniques result in imprecise baseline removal since the source spectrum itself may have rapid fluctuations in intensity between one acquisition and the next. It turned out that a main influence on these fluctuations results from the power output of the light source used for OCT. Relying on a single acquisition or an average prevents complete subtraction of the actual baseline spectrum from each individual interferogram. It is also possible to remove the DC artefact by hardware based methods that require use of phase shifters or other methods to modulate the phase over multiple acquisitions. However, this requires a more complicated system design and may also require multiple acquisitions at each sample position to obtain the necessary data.

Within the present invention, a new technique in order to fully or, at least, by far better remove DC artefacts is proposed. Performing data processing on the scan data set now includes the following steps for each spectrum acquired: determining a scaling factor for the scan data set or the spectrum, scaling the baseline spectrum with the scaling factor, and removing the scaled baseline spectrum from the spectrum.

With respect to several spectra in the scan data set it is noted that, in particular, an individual scaling factor for each of the several spectra is determined, and, accordingly, the baseline spectrum is scaled separately with each of the scaling factors, and the respective scaled baseline spectrum is then removed from the respective spectrum. In other words, the scaling factor is, in particular, determined individually for each scan data set and/or for each spectrum acquired.

By applying an A-scan dependent scaling factor to the baseline spectrum to properly match its magnitude with that of each individual acquisition, the DC artefact can be more precisely removed. The acquisition of the baseline spectrum may occur before scan acquisition or it may be derived from the data acquired during a scan by taking an average of each individual A-scan, as in traditional methods. Once the baseline spectrum is acquired, it is multiplied by the A-scan dependent scaling factor and then subtracted from each individual A-scan (which is a spectrum).

There are several preferred ways to acquire the baseline spectrum. For example, the baseline spectrum can be acquired before or at the end of each scan (for acquiring a scan data set) by physically blocking light from the light source going into the sample arm of the OCT means and, thus, only recording the resulting spectrum from the reference arm. The baseline spectrum may also be acquired by averaging either all or a portion of the A-scans (spectra) from an acquired scan (i.e., from several spectra from the scan data set). The following equation represents such averaging:

$$I_{DC} = \frac{1}{N} \sum\nolimits_{n=1}^{N} I_n.$$

In this equation, $I_{DC}$ is the baseline spectrum, N is the number of A-scans (spectra) in the scan (scan data set), and $I_n$ is the $n^{th}$ acquired A-scan (spectrum) in the scan (scan data set).

Once the baseline spectrum is acquired, the scaling factor for correcting the spectra can be determined in different preferred ways. For example, the scaling factor for the baseline spectrum can be determined by taking a low-pass filter (such as convolution with a Gaussian) of each individual A-scan (spectrum) and then computing a ratio of the low-pass filtered A-scan with the baseline spectrum, as represented in the following equation:

$$\alpha_n = \frac{G \otimes I_n}{G \otimes I_{DC}}.$$

In this equation, $\alpha_n$ is the $n^{th}$ scaling factor corresponding to A-scan or spectrum $I_n$. The low-pass filter is represented by G and is applied to both the $n_{th}$ A-scan and the baseline spectrum $I_{DC}$. Applying this scaling factor to the baseline spectrum allows it to be more closely matched to the individual A-scan (spectrum) and more completely remove the baseline spectrum from the signal of interest, as represented in the following equation:

$$I_{sn} = I_n - \alpha_n I_{DC}$$

In this equation, $I_{sn}$ is the $n_{th}$ A-scan with the baseline spectrum subtracted. Another way to compute the scaling factor may include computing a correlation between the baseline spectrum and the individual A-scan. Other examples may include determining a localized average around the designated portion of the A-scan prior to Fourier transform and taking a ratio with the corresponding portion of the baseline spectrum.

Such adaptive baseline correction or baseline removal allows improved visualization in real-time, what is of particular relevance during surgeries.

The invention also relates to an optical coherence tomography (OCT) imaging system for (in particular, real-time) imaging a subject, e.g. an eye, comprising the control system according to the invention and as described above, and optical coherence tomography imaging means in order to perform the OCT scan (for a more detailed description of such OCT imaging means it is referred to the drawings and the corresponding description). Preferably, the OCT imaging system is configured to display an image of the subject on display means. Such display means can be part of the OCT imaging system.

The invention also relates to a method for imaging a subject like an eye, using optical coherence tomography (OCT), preferably, spectral domain OCT. The method comprises the following steps of an imaging process: acquiring a scan data set from the subject by means of optical coherence tomography, the scan data set including one or (preferably) several spectra, performing data processing on the spectrum or on each of the several spectra of the scan data set, including per spectrum: determining a scaling factor for the spectrum, scaling a baseline spectrum with a scaling factor, and removing the scaled baseline spectrum from the spectrum; and providing a baseline corrected image data set of the subject for an image of the subject to be displayed and, preferably, displaying the image of the subject on, e.g., display means of an OCT imaging system. Again, in case of several spectra included in the scan data set, the scaling factor is individually determined for each of the spectra, and, accordingly, individual scaled baseline spectra are determined and removed for the respective spectrum.

With respect to further preferred details and advantages of the OCT imaging system and the method, it is also referred to the remarks for the control system above, which apply here correspondingly.

The invention also relates to a computer program with a program code for performing a method according to the invention when the computer program is run on a processor, processing system or control system, in particular, like described before.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

SHORT DESCRIPTION OF THE FIGURES

DETAILED DESCRIPTION

Figure 1:
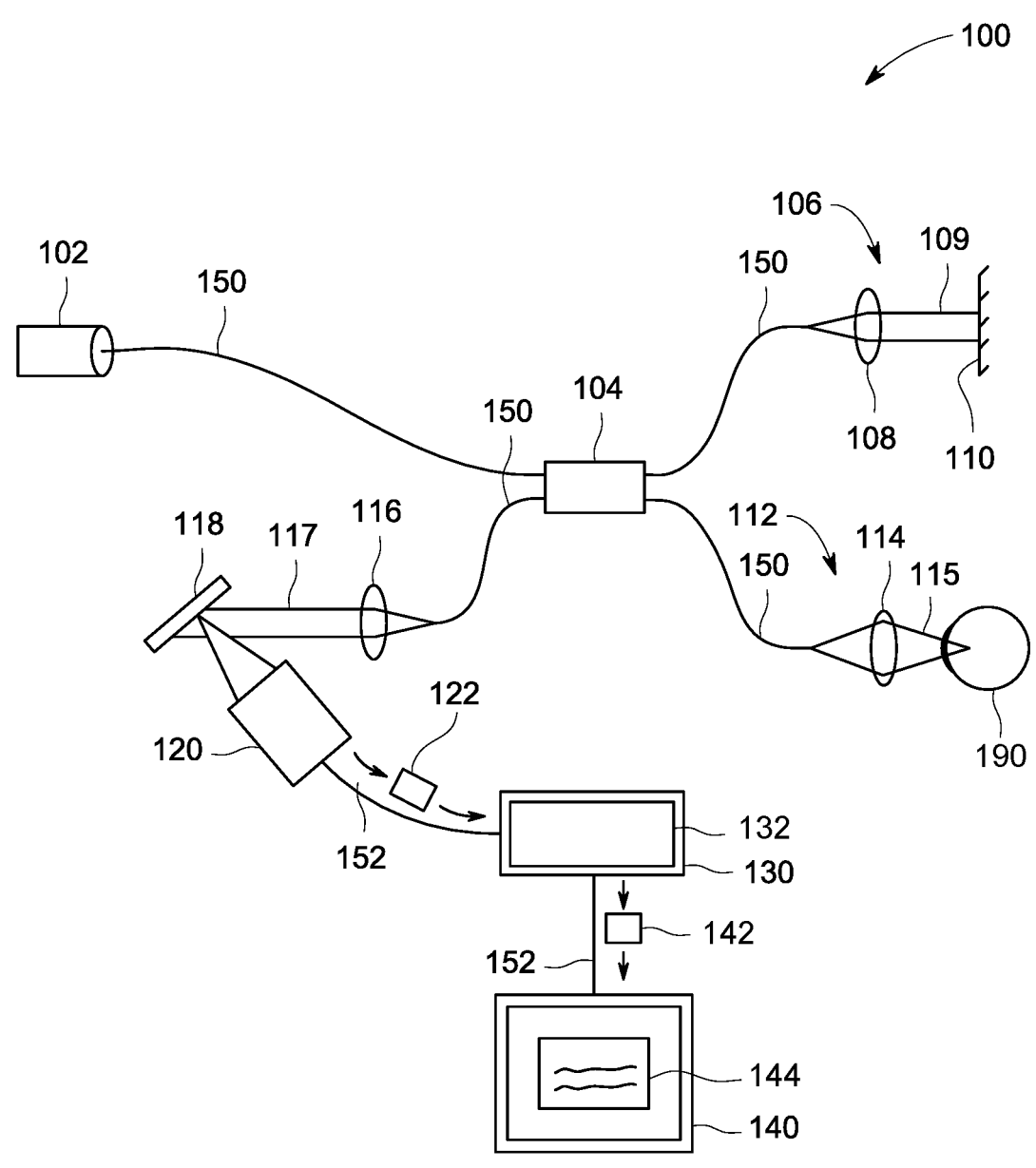
FIG. 1 shows a schematic overview of an OCT imaging system according to the invention in a preferred embodiment.

In FIG. 1, a schematic overview of an optical coherence tomography (OCT) imaging system 100 according to the invention in a preferred embodiment is shown. The OCT imaging system 100 comprises a light source 102 (e.g., a low coherence light source), a beam splitter 104, a reference arm 106, a sample arm 112, a diffraction grating 118, a detector 120 (e.g., a camera), a control system 130 and display means 140 (e.g., a display or monitor).

Light originating from the light source 102 is guided, e.g., via fiber optic cables 150, to the beam splitter 104 and a first part of the light is transmitted through the beam splitter 104 and is then guided, via optics 108 (which is only schematically shown and represented by a lens) in order to create a light beam 109 to a reference mirror 110, wherein the optics 106 and the reference mirror 110 are part of the reference arm 106.

Light reflected from the reference mirror 110 is guided back to the beam splitter 104 and is transmitted through the beam splitter 104 and is then guided, via optics 116 (which is only schematically shown and represented by a lens) in order to create a light beam 117 to the diffraction grating 118.

A second part of the light, originating from the light source 102 and transmitted through the beam splitter 104 is guided via optics 114 (which is only schematically shown and represented by a lens) in order to create a light beam 115 (for scanning) to the subject 190 to be imaged, which, by means of example, is an eye. The optics 114 are part of the sample arm 112.

Light reflected from the subject 190 or the tissue material therein is guided back to the beam splitter 104 and is transmitted through the beam splitter 104 and is then guided, via optics 116 to the diffraction grating 118. Thus, light reflected in the reference arm 106 and light reflected in the sample arm 112 are combined by means of the beam splitter 104 and are guided, e.g., via a fiber optic cable 150, and in a combined light beam 117 to the diffraction grating 118.

Light reaching the diffraction grating 118 is diffracted and captured by the detector 120. In this way, the detector 120, which acts as a spectrometer, creates or acquires scan data or scan data sets 122 that are transmitted, e.g., via an electrical cable 152, to the control system 130 comprising processing means (or a processor) 132. A scan data set 122 is then processed to obtain image data set 142 that is transmitted, e.g., via an electrical cable 152, to the display means 140 and displayed as a real-time image 144, i.e., an image that represents the currently scanned subject 190 in real-time.

The process in which the intensity scan data set 122 is processed or converted to the image data set 142 that allows displaying of the scanned subject 190 on the display means 140 will be described in more detail in the following.

Figures 2, 3:
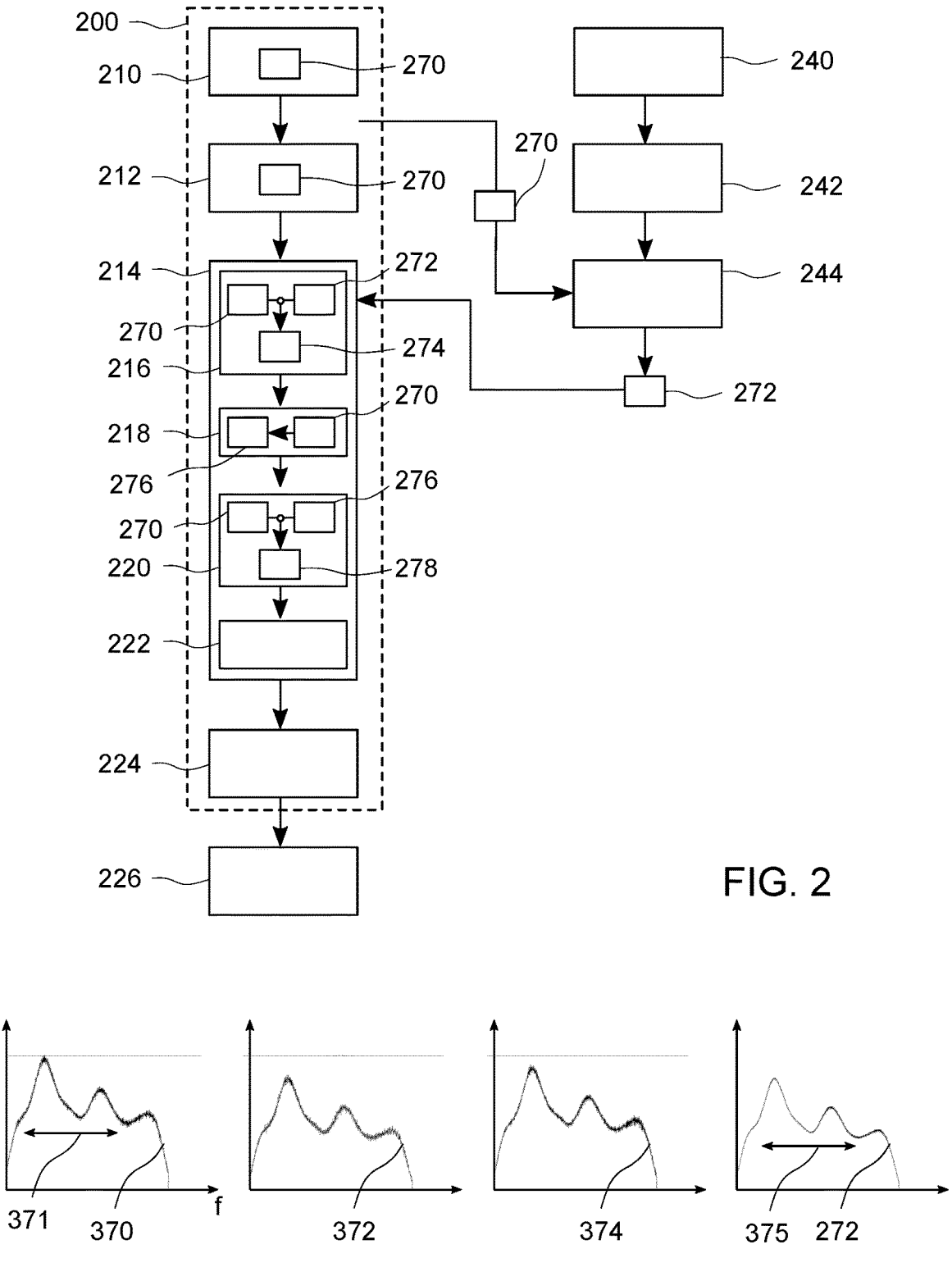
FIG. 2 shows, schematically, a flow scheme describing a method according to the invention in a preferred embodiment.
FIG. 3 shows, schematically, different spectra acquired by OCT for explanation of the invention.

In FIG. 2, a flow scheme describing a method according to the invention in a preferred embodiment is shown schematically. For providing a real-time OCT image, an imaging process 200 is repeatedly performed, within which scan data is acquired and image data is provided to be displayed as an image or OCT image on display means as described with respect to FIG. 1.

The imaging process 200 starts with a step 210 of acquiring a scan data set from the subject by means of optical coherence tomography. The scan data set (see reference numeral 122 in FIG. 1) includes at least one spectrum 270. Typically, such data set includes several spectra, each corresponding to an A-scan of the subject. It is to be noted, however, that the method basically also works with the data set including only one spectrum. In a step 212, the scan data set including the at least one spectrum 270 is received at the control system or its processing means.

In FIG. 3, three different and typical spectra 370, 372 and 374 (with intensity I shown vs. frequency f) acquired by OCT are shown. These three different spectra as they might be included in one scan data set, show a strong carrier or base spectrum (the overall course of the spectrum) of the interferometric signal (the minor variations which look like noise). Further, it can be seen that the average magnitude or amplitude of the spectra are different from each other (see the horizontal line drawn at the same intensity value in each of the three diagrams).

In a step 214, data processing is performed on the scan data set or the at least one spectrum 270, respectively. This data processing step in turn includes several steps (or sub steps). In a step 216, a scaling factor 274 is determined for the scan data set or its spectra 270. The scaling factor will be used to scale a baseline spectrum 272 which shall (after scaling) be removed or subtracted from each of the spectra of the scan data set (or the only spectrum if only one is present).

Note that, preferably, an individual scaling factor is determined for each spectrum 270 (or 370, 372, 374) of the scan data set. However, it would also be possible to determine only one (common) scaling factor 274 for all spectra of one scan data set.

The scaling factor 274 can be determined by correlating at least a portion of a spectrum of the scan data set with a corresponding portion of the baseline spectrum. Such baseline spectrum 272—which basically corresponds to the carrier or base spectrum mentioned above—is shown in FIG. 3. The baseline spectrum 272 to be used in step 214 can be acquired in different ways as mentioned before.

One way is to use the spectra 270 included in the scan data set acquired in step 210 (if serval spectra are include). In step 244 an average of these spectra is determined in order to receive the baseline spectrum 272. The baseline spectrum 272 shown in FIG. 3, for example, corresponds to an average of the three spectra 370, 372 and 374. Note that also only portions of the spectra—only such portion exemplarily indicated with 371 in FIG. 3—may be used for determine the baseline spectrum. The baseline spectrum 272 can then be used in step 214. The determining of the baseline spectrum can then also be considered part of the imaging process 200.

Another way to determine the baseline spectrum 272 is to block light going into the sample arm as shown in step 240 and then acquire a spectrum as shown in step 242. Thus, a spectrum without influence from the sample is acquired. Also, serval spectra can be acquired in this way which then can be averaged in step 244 as in the way presented before. This way can preferably be performed before each cycle of an imaging process 200 (which also is at the end of the preceding one).

Turning back to step 216, the scaling factor 274 can be determined by correlating at least a portion 371 of a spectrum 270 (or 3770, 372, 374) of the scan data set with a corresponding portion 375 of the baseline spectrum 272. Of course, the full spectrum can be correlated with the baseline spectrum. Such correlation can include, for example, applying a filter, preferably a low pass filter, to the portion of the spectrum of the scan data set and/or to the portion of the baseline spectrum. Further, correlating can include, determining an average value of the portion of the spectrum of the scan data set and determining a ratio of the average value with the (corresponding) portion of the baseline spectrum (see second equation above).

After having determined the scaling factor 274 (preferably for each spectrum included in the scan data set), each scaling factor 274 is applied, in step 218, to the corresponding spectrum 270 of the scan data set in order to receive a scaled baseline spectrum 278. Note that, preferably, an individual scaled baseline spectrum 278 is determined for each spectrum 270 (or 370, 372, 374) included in the scan data set.

In step 220, the respective scaled baseline spectrum 276 is removed or subtracted (see third equation above) from the respective spectrum 270 of the scan data set in order to receive baseline corrected spectra 278. In step 222, a Fourier transform can be applied to the baseline corrected spectra and, thus, a baseline corrected image data set (see reference numeral 142 in FIG. 1) can be provided in step 224, the baseline corrected image data set including at least one baseline corrected spectrum 278, preferably, several baseline corrected spectra. In step 226, an image of the subject corresponding to the baseline corrected image data set can be displayed at display means (see FIG. 1).

Figure 4:
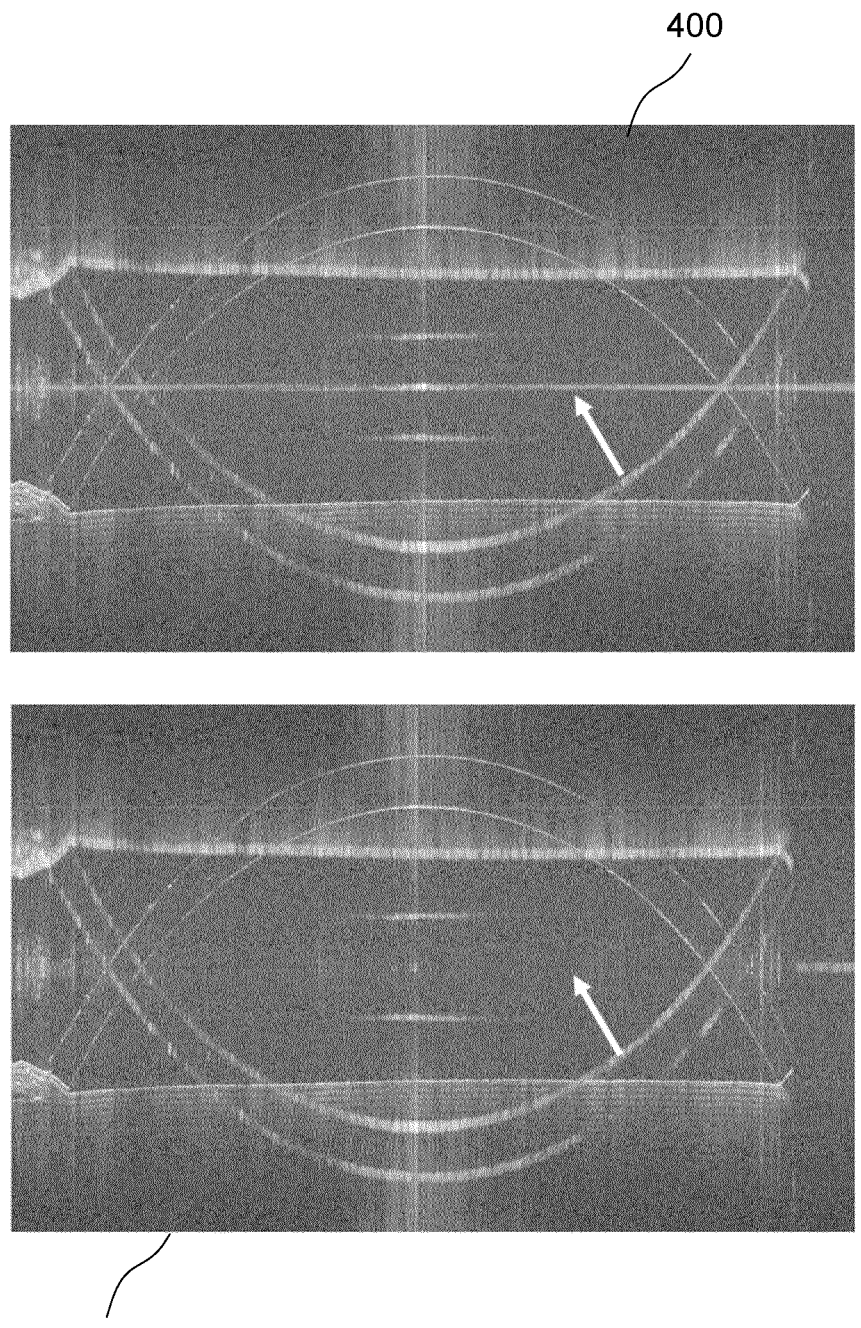
FIG. 4 shows OCT images with and without using a method according to the invention.

In FIG. 4, OCT images with and without using a method according to the invention are shown. Each image corresponds to a B-scan resulting from several A-scans or spectra. Upper image 400 includes a horizontal line in the middle (in a bright streak at the zero frequency position), indicated by a white arrow. This horizontal line results from subtracting just the average baseline spectrum results. Lower image 410, however, results from applying adaptive scaling to the baseline spectrum before subtracting from each A-scan according to a preferred embodiment of the invention. The bright band (the horizontal line in the middle) is removed (the white arrow is again present at the same position as in image 400 above).

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to an OCT imaging system comprising a control system as described in connection with one or more of the FIGS. 1 to 4. Alternatively, an OCT imaging system may be part of or connected to a system as described in connection with one or more of the FIGS. 1 to 4. FIG. 1 shows a schematic illustration of an OCT imaging system 100 configured to perform a method described herein. The OCT imaging system 100 comprises an OCT imaging means and a computer or control system 130. The OCT imaging means are configured to take images and are connected to the control system 130. The control system 130 is configured to execute at least a part of a method described herein. The control system 130 may be configured to execute a machine learning algorithm. The control system 130 and (parts of) OCT imaging means may be separate entities but can also be integrated together in one common housing. The control system 130 may be part of a central processing system of the OCT imaging system 100 and/or the control system 130 may be part of a subcomponent of the OCT imaging system 100, such as a sensor, an actor, a camera or an illumination unit, etc. of the OCT imaging system 100.

The control system 130 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The control system 130 may comprise any circuit or combination of circuits. In one embodiment, the control system 130 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the control system 130 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The control system 130 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The control system 130 may also include a display device, one or more speakers, and a keyboard and/or controller, which can include a mouse, trackball, touch screen, voice-recognition device, or any other device that permits a system user to input information into and receive information from the control system 130.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS

100 OCT imaging system
102 light source
104 beam splitter
106 reference arm
108, 114, 116 optics
109, 115, 117 light beams
110 reference mirror
112 sample arm
118 diffraction grating
120 detector
122 intensity scan data
130 control system
132 processing means
140 display means
142 image data set
150 fiber optic cable
152 electrical cable
190 subject
200 imaging process
210-226, 240-244 method steps
270, 370, 372, 376 spectra
272 baseline spectrum
274 scaling factor
276 scaled baseline spectrum

10

278 baseline corrected spectrum
371 portion of spectrum
375 portion of baseline spectrum
400, 410 OCT images

The invention claimed is:

1. A controller for controlling an optical coherence tomography apparatus for imaging a subject, the controller being configured to perform the following steps of an imaging process:
   receiving a scan data set from the subject being acquired by the optical coherence tomography apparatus, the scan data set including one or several spectra,
   performing data processing on each respective spectrum of the several spectra of the scan data set, by:
      determining an individual scaling factor for the respective spectrum,
      scaling a respective baseline spectrum with the individual scaling factor to obtain a scaled baseline spectrum, and
      subtracting the scaled baseline spectrum from the respective spectrum to obtain a respective baseline corrected spectrum; and
   providing a baseline corrected image data set of the subject based on the baseline corrected spectra for an image of the subject to be displayed.

2. The controller of claim 1, being configured to repeatedly perform the imaging process, the scaling factors being determined individually for each scan data set.

3. The controller of claim 1, wherein each individual scaling factor is determined by correlating at least a portion of the respective spectrum of the scan data set with a corresponding portion of the respective baseline spectrum.

4. The controller of claim 3, wherein the correlating the portion of the respective spectrum of the scan data set with the corresponding portion of the respective baseline spectrum includes applying a filter to the portion of the respective spectrum of the scan data set and to the corresponding portion of the respective baseline spectrum.

5. The controller of claim 3, wherein the correlating the portion of the respective spectrum of the scan data set with the corresponding portion of the respective baseline spectrum includes determining an average value of the portion of the respective spectrum of the scan data set, and determining a ratio of the average value with the portion of the respective baseline spectrum.

6. The controller of claim 1, wherein the baseline spectra are acquired before receiving the scan data set and to be used for at least one subsequent imaging process.

7. The controller of claim 1, wherein the baseline spectra are acquired from the several spectra of the scan data set and to be used for the current imaging process.

8. The controller of claim 1, wherein the scan data set from the subject is acquired by spectral domain optical coherence tomography.

9. An optical coherence tomography imaging system for imaging a subject, the optical coherence tomography image system comprising the controller of claim 1 and the optical coherence tomography apparatus, wherein the optical coherence tomography apparatus comprises a light source and a display configured to display the image of the subject.

10. The optical coherence tomography imaging system of claim 9, configured for use during a surgical procedure being performed on the subject.

11. A method for imaging a subject using an optical coherence tomography imaging system, the method comprising the following steps of an imaging process:

acquiring a scan data set from the subject by using optical coherence tomography imaging system, the scan data set including several spectra, performing data processing on each respective spectrum of the several spectra of the scan data set, by:

determining an individual scaling factor for the respective spectrum, scaling a respective baseline spectrum with the individual scaling factor to obtain a scaled baseline spectrum, and subtracting the scaled baseline spectrum from the respective spectrum to obtain a respective baseline corrected spectrum; and providing a baseline corrected image data set of the subject based on the baseline corrected spectra for an image of the subject to be displayed.

12. The method of claim 11, comprising repeatedly performing the imaging process, wherein the individual scaling factors are determined for each scan data set.

13. The method of claim 11, comprising, before acquiring the scan data set, acquiring the baseline spectra to be used for at least one subsequent imaging process.

14. The method of claim 13, wherein the baseline spectra are acquired by blocking light going into a sample arm of optical coherence tomography imaging system, which include a light source.

15. A non-transitory, computer-readable medium comprising a program code that, when the program code is executed on a processor, a computer, or a programmable hardware component, causes the processor, the computer, or the programmable hardware component to perform the method of claim 11.

* * * * *